Jan. 19, 1971 B. D. PILE 3,555,578
LIGHTWEIGHT FOLDING LITTER
Filed Sept. 9, 1968
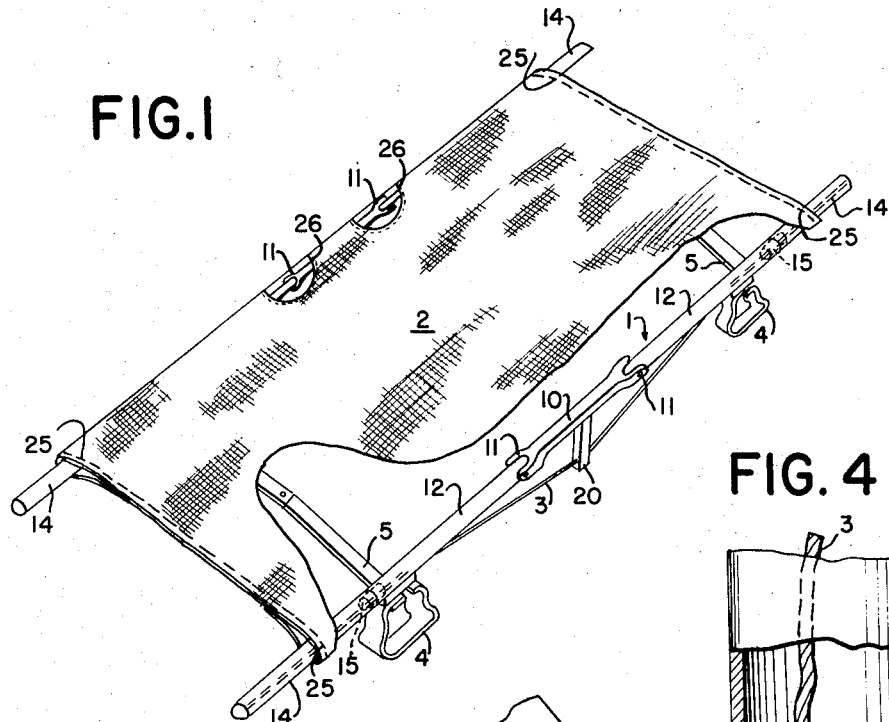
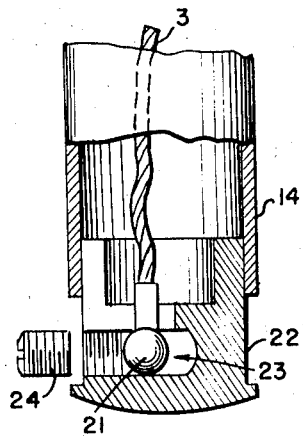
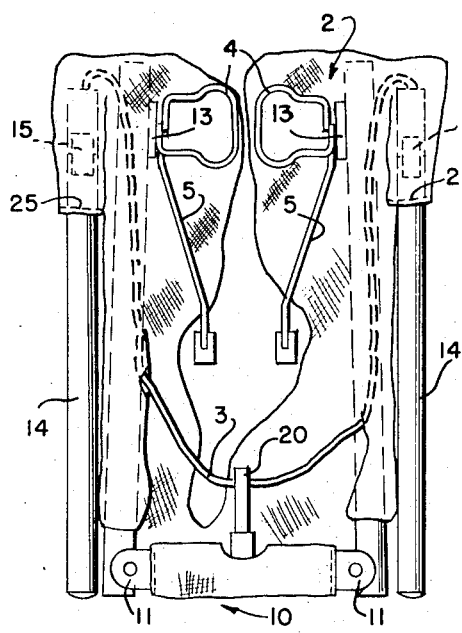
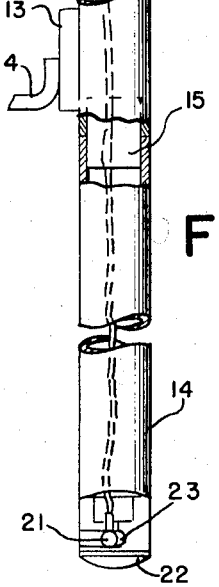
INVENTOR
BENJAMIN D. PILE
BY
ATTORNEY

United States Patent Office 3,555,578
Patented Jan. 19, 1971

3,555,578
LIGHTWEIGHT FOLDING LITTER
Benjamin D. Pile, Bayside, N.Y. (411 Lakewood Circle, Apt. A1002, Colorado Springs, Colo. 80910)
Filed Sept. 9, 1968, Ser. No. 758,267
Int. Cl. A61g 1/00
U.S. Cl. 5—82                                     3 Claims

ABSTRACT OF THE DISCLOSURE

This invention is a lightweight folding litter having longitudinal cable supports. The litter is especially adapted for field use because it is light and folds into a compact package. The litter comprises longitudinal sections hinged in the center with separable tubing handles. The handles are carried by the cable supports so that when the litter is folded the handles separate from the hinged center sections, but remain a part of the folded package being joined thereto by the cable supports.

---

The invention described herein may be manufactured and used by or for the Government for governmental purposes without the payment to me of any royalty thereon.

CROSS REFERENCE TO RELATED APPLICATIONS

The cable support utilized in the litter of this invention is similar to that disclosed in my U.S. Pats. Nos. 3,037,215 and 3,359,576.

BACKGROUND OF THE INVENTION

(1) Field of the invention

This invention relates to longitudinally reinforced litters for field use which are foldable to form a small compact package having no loose parts, and therefore easily adapted to form a back pack.

(2) Description of the prior art

Litters for field use of necessity must be strong and durable for carrying injured persons over rough terrain for long distances. However, when not in use these litters must be foldable to a compact, easily transportable package.

SUMMARY

The litter of this invention utilizes a cable support for the longitudinal member which gives added support to the litter without a substantial addition in weight. The cable support also connects separable handles to the central portion of the litter so that when said litter is folded the handles, after separation from the longitudinal central frame are still connected to the frame to form a compact package with no loose parts.

Accordingly, it is an object of this invention to form a lightweight foldable litter with a cable reinforcing member.

It is another object to provide a foldable litter capable of forming a compact, easily transportable package when not in use.

It is a further object to provide a foldable litter having a hinged central portion and a cable tension support attached to the central portion which adds counterbalancing support for loads and carries the detachable handles when the litter is folded.

BRIEF DESCRIPTION OF THE DRAWINGS

These and other objects will become apparent with reference to the following drawings and description wherein:

FIG. 1 is a perspective view of the litter of this invention assembled.

FIG. 2 is a front view of the litter disassembled and folded for storage or transportation.

FIG. 3 is a side view in partial section of the litter handle.

FIG. 4 is a sectional view of the cable termination in the litter handle.

DESCRIPTION OF THE PREFERRED EMBODIMENT

The litter of this invention includes a pair of longitudinal braces 1, and a cover 2, a pair of cable supports 3, support stirrups 4, and a pair of hinged, transverse spreader bars 5.

Each longitudinal brace 1, has a central cable support 10, connected by hinges 11, to two intermediate support members 12. Members 12, carry stirrups 4, connected thereto by mounting block 13. Handles 14, are slidably joined to members 12, by bushing 15.

The braces 1, are connected by spreader bars 5. Bars 5, are pivotally connected to blocks 13, and centrally hinged to collapse the litter by folding inwardly to bring the braces 1, together lengthwise.

Cables 3 are fixed to posts 20 and extend through holes 17, in members 12, and into handles 14, terminating in ball 21. Cables 3 are attached to plug 22, in handles 14, when ball 21 rests in recess 23, and is held in place by set screw 24. When the litter is assembled, the cables 3 are in tension to counterbalance a load carried by the litter on the upper surface of cover 2.

The cover 2 is held to the longitudinal braces 1 by stitching 25. A cutaway portion 26 of the cover 2 is located around the hinges 11 to enable the longitudinal braces 1 to be folded.

To collapse the litter the longitudinal braces 1 are folded at hinges 11, and transverse spreader bars 5 are folded to position braces 1, along side each other with members 12 disposed at right angles to the central portions 10. When braces 1 are folded the tension on cables 3 is released. Handles 14 may then be disengaged from the ends of members 12, and folded parallel to the said members as shown in FIG. 2. Handles 14, carrying bushings 15, are disengaged by sliding bushing 15 out of frame 12.

A model constructed having a total weight of ten and one half pounds was folded to a rectangular configuration twenty-two and one half inches long, fourteen inches wide, and three inches deep making a cube of 0.55 cubic foot. The litter opens to the standard size of ninety inches long, twenty-two inches wide with stirrups symmetrically spaced forty-five inches apart.

Not only is the invention capable of being folded into a more compact, easily transportable package than prior devices, but the speed with which it can be unfolded makes it ideal for combat and other emergency uses.

It will be obvious to one skilled in the art that various modifications may be made including the method the handles 14, engage the members 12, the type of support used, in place of stirrups 4, and the method used to terminate cable 3, in handle 14. Obvious mechanical substitutions may be made within the scope of this invention.

I claim:
1. In a folding litter having adjacently disposed, foldable, longitudinal supports and a body supporting cover disposed therebetween the improvement comprising:
   (a) handles slidably engaging intermediate sections of said longitudinal supports, said intermediate sections being hinged to a central section whereby said litter can be folded into a rectangle by folding said intermediate sections perpendicular to said central support and by folding said handles adjacent to said intermediate supports;

(b) a rigid post depending from the lower surface of each of said longitudinal supports, and disposed centrally between the ends of said supports; and (c) an elongated tension support extending from the lower end of each of said posts into the end portion of each of said longitudinal supports, through the said handle engaging the end of said longitudinal member, the ends of said tension support terminating at the distal portion of said handles so that when the litter is unfolded said tension support urges the proximal portion of said handles into engagement with the ends of said longitudinal support and urges the vertical post upwardly into the central portion of the longitudinal support to counterbalance any load carried by the cover and longitudinal supports.

2. The structure of claim 1 wherein said tension support is:

a cable, each end of said cable terminating in a sphere releasably engaged in a recess of a plug mounted in the distal portion of each of said handles so that when said litter is unfolded the tension on said cable urges said plugs into said handles and urges the proximal portion of said handles into engagement with the ends of said longitudinal support and urges the vertical post upwardly into the central section of the longitudinal support to counterbalance any load carried by the cover and longitudinal supports.

3. The litter of claim 2 wherein said supporting cover is held taut and said longitudinal supports are held apart by transverse bars, said bars being centrally hinged and pivotally connected to the longitudinal supports so that said supporting cover may be collapsed and said longitudinal supports brought together lengthwise by folding said bars inwardly.

References Cited

UNITED STATES PATENTS

| 3,037,215 | 6/1962 | Pile | 5—111 |
| 3,426,367 | 2/1969 | Bradford | 5—82 |

FOREIGN PATENTS

| 228,224 | 11/1910 | Germany | 5—82 |
| 19,071 | 8/1911 | Great Britain | 5—82 |

KENNETH DOWNEY, Primary Examiner

U.S. Cl. X.R.

5—111